United States Patent
Van Houcke et al.

(10) Patent No.: US 12,252,604 B2
(45) Date of Patent: Mar. 18, 2025

(54) FOAMED POLYPROPYLENE COMPOSITION SUITABLE FOR SHEETS AND ARTICLES

(71) Applicants: ABU DHABI POLYMERS CO. LTD. (BOROUGE) L.L.C., Abu Dhabi (AE); Borealis AG, Vienna (AT)

(72) Inventors: Daniel Van Houcke, Abu Dhabi (AE); Emelito Tenorio, Abu Dhabi (AE)

(73) Assignees: ABU DHABI POLYMERS CO. LTD. (BOROUGE) L.L.C., Abu Dhabi (AE); Borealis AG, Vienna (AT)

( * ) Notice: Subject to any disclaimer, the term of this patent is extended or adjusted under 35 U.S.C. 154(b) by 131 days.

(21) Appl. No.: 17/785,271

(22) PCT Filed: Dec. 16, 2020

(86) PCT No.: PCT/EP2020/086475
§ 371 (c)(1),
(2) Date: Jun. 14, 2022

(87) PCT Pub. No.: WO2021/122783
PCT Pub. Date: Jun. 24, 2021

(65) Prior Publication Data
US 2023/0024936 A1    Jan. 26, 2023

(30) Foreign Application Priority Data
Dec. 16, 2019 (EP) .................................... 19216557

(51) Int. Cl.
*C08L 23/12* (2006.01)
*B32B 5/18* (2006.01)
(Continued)

(52) U.S. Cl.
CPC ............... *C08L 23/12* (2013.01); *B32B 5/18* (2013.01); *B32B 27/065* (2013.01); *B32B 27/32* (2013.01);
(Continued)

(58) Field of Classification Search
CPC ...... C08L 23/12; C08L 2203/14; C08L 23/06; B32B 5/18; B32B 27/065; B32B 27/32;
(Continued)

(56) References Cited

U.S. PATENT DOCUMENTS

| | | | |
|---|---|---|---|
| 4,626,555 A | 12/1986 | Endo et al. | |
| 2011/0127688 A1* | 6/2011 | Onodera | C08J 9/0061 264/54 |
| 2014/0088214 A1 | 3/2014 | Masahiko et al. | |

FOREIGN PATENT DOCUMENTS

| | | |
|---|---|---|
| DE | 3539352 A1 | 5/1986 |
| EP | 0787750 A2 | 8/1997 |

(Continued)

OTHER PUBLICATIONS

English Translation of Japanese Office Action for Japanese Patent Application No. 2022-536670 dated Jul. 25, 2023, 8 pages.
(Continued)

*Primary Examiner* — Nathan L Van Sell
(74) *Attorney, Agent, or Firm* — Lowenstein Sandler LLP

(57) ABSTRACT

The present invention relates to a foamed polypropylene composition comprising (A) from 60.0 to 95.0 wt % of a linear propylene homopolymer and (B) from 5.0 to 40.0 wt % of a low density polyethylene, based on the total weight of the polypropylene composition, wherein the polypropylene composition before foaming has a melt flow rate $MFR_2$ of from 0.1 to 5.0 g/10 min, determined according to ISO 1133 at a load of 2.16 kg and a temperature of 230° C., and a $F_{30}$ melt strength of from 0.1 to 2.0 cN, determined according to ISO 16790:2005, a sheet comprising said foamed polypropylene composition, an article comprising said sheet, a process for producing said sheet and the use of said foamed polypropylene composition or said sheet for producing an article.

20 Claims, 3 Drawing Sheets

(51) Int. Cl.
   *B32B 5/32*     (2006.01)
   *B32B 27/06*    (2006.01)
   *B32B 27/32*    (2006.01)
   *C08J 9/00*     (2006.01)

(52) U.S. Cl.
   CPC .............. *C08J 9/0061* (2013.01); *B32B 5/32* (2013.01); *B32B 2250/40* (2013.01); *B32B 2266/025* (2013.01); *B32B 2307/72* (2013.01); *B32B 2307/732* (2013.01); *B32B 2439/02* (2013.01); *B32B 2439/60* (2013.01); *B32B 2439/66* (2013.01); *C08J 2323/12* (2013.01); *C08J 2423/06* (2013.01); *C08L 2203/14* (2013.01)

(58) Field of Classification Search
   CPC . B32B 5/32; B32B 2250/40; B32B 2266/025; B32B 2307/72; B32B 2307/732; B32B 2439/02; B32B 2439/60; B32B 2439/66; B32B 1/00; B32B 2250/03; B32B 2270/00; B32B 2307/304; B32B 2307/7265; B32B 2307/738; B32B 2307/75; B32B 2439/70; B32B 5/16; C08J 9/0061; C08J 2323/12; C08J 2423/06; C08K 5/0083
   See application file for complete search history.

(56) References Cited

FOREIGN PATENT DOCUMENTS

| | | | | |
|---|---|---|---|---|
| EP | 0879830 | A1 | 11/1998 | |
| EP | 0887379 | A1 | 12/1998 | |
| EP | 887381 | A1 | 12/1998 | |
| EP | 0890612 | A2 | 1/1999 | |
| EP | 991684 | A1 | 4/2000 | |
| EP | 2000504 | A1 * | 12/2008 | .............. C08L 23/06 |
| EP | 2520425 | A1 | 11/2012 | |
| EP | 2610270 | A1 | 7/2013 | |
| EP | 2610271 | A1 | 7/2013 | |
| EP | 2610272 | A1 | 7/2013 | |
| EP | 3127951 | A1 | 2/2017 | |
| JP | 60141728 | A | 7/1985 | |
| JP | 60255834 | A | 12/1985 | |
| JP | 2003094504 | A | 4/2003 | |
| JP | 3996037 | B2 | 10/2007 | |
| JP | 4739686 | B2 | 8/2011 | |
| JP | 2015093963 | A | 5/2015 | |
| JP | 2019163347 | A | 9/2019 | |
| KR | 20180025192 | A | 3/2018 | |
| WO | 9212182 | A1 | 7/1992 | |
| WO | 9858977 | A1 | 6/1998 | |
| WO | 9924478 | A1 | 5/1999 | |
| WO | 9924479 | A1 | 5/1999 | |
| WO | 0068315 | A1 | 11/2000 | |
| WO | 2004000899 | A1 | 12/2003 | |
| WO | 2004111095 | A1 | 12/2004 | |
| WO | 2012007430 | A1 | 1/2012 | |
| WO | 12157709 | A1 | 7/2014 | |
| WO | 2017068106 | A1 | 4/2017 | |

OTHER PUBLICATIONS

Chinese Office Action with English Translation for Chinese Patent Application No. 202080086504.3 dated Mar. 21, 2024, 9 pages.
Huaming et al., Machine Translation of Polymer Science Experiment along with original, Dec. 31, 2011, pp. 180-185, 14 pages.
China Price Yearbook with English Translation, 1992, pp. 356-357, 6 pages.
Naguib, et al. Fundamental Foaming Mechanisms Governing the Volume Expansion of Extruded Polypropylene Foams, Journal of Applied Polymer Science, 91, 2661-2668 (2004).
Lee et al. "Foam Extrusion Principles and Practice—Continuous Production of High-Density and Low-Density Microcellular Plastics in Extrusion", Technomic Publishing (2000) 24 pages.
Wagner, et al. "Rheotens-Mastercurves and Drawability of Polymer Melts", Polymer Engineering and Science, vol. 36, pp. 925 to 935.
European Search Report for 19216557.9 dated Jun. 23, 2020, 6 pages.
International Search Report for PCT/EP2020/086475 mailed Mar. 24, 2021, 12 pages.
Chinese Office Action with English Translation for Chinese Patent Application No. 202080086504.3 dated Aug. 31, 2023, 8 pages.
Liu, et al., "Rheology and Foaming Behavior of Linear Polypropylene / Low-Densiy Polyethylene Blends", Department of Materials Science and Engineering, 2011, 4 pages.
Office Action with English translation for Korean Patent Application No. 10-2022-7024118 mailed May 7, 2024, 13 pages.
Notice of Allowance in Korean Patent Application No. 10-2022-7024118 mailed on Jan. 10, 2025 including English translation, 6 pages.

\* cited by examiner

FOAMED POLYPROPYLENE COMPOSITION SUITABLE FOR SHEETS AND ARTICLES

CROSS-REFERENCE TO RELATED APPLICATION(S)

The present application is a national stage entry under 35 U.S.C. § 371 of International Application No. PCT/EP2020/086475, filed on Dec. 16, 2020, which claims priority to European Patent Application No. 19216557.9, filed on Dec. 16, 2019. The contents of these applications are hereby incorporated by reference in their entirety.

FIELD OF THE INVENTION

The present invention relates to a foamed polypropylene composition comprising a linear propylene homopolymer and a low density polyethylene, a sheet comprising the foamed polypropylene composition, an article comprising said sheet, a process for producing said sheet and the use of said foamed polypropylene composition or said sheet for the production of an article.

TECHNICAL BACKGROUND

Polymers are generally used for producing sheets which then can be used for the production of packaging articles such as containers like bottles, cups, cans, canisters, bowls or trays. Polypropylene based resins have been generally used for the preparation of sheets especially with a thickness of around 1000 micrometers due to their good processability and mechanical properties.

The polypropylene based resins thereby can be easily customized by adding pigments in form of color masterbatches, fillers such as talc. The packaging products such as the containers as discussed above can be prepared by thermoforming. For thermoforming applications the polypropylene based resins need to show a good stretchability together with good mechanical properties, dimensional stability, heat resistance, stability to microwave radiation and a high surface quality.

For reducing the weight of the thermoformed articles while maintaining their wall thickness the polypropylene based resins can be foamed. Thereby, the foaming usually takes place during the forming of the sheet in the presence of a chemical or physical foaming agent. Thereby, foaming reduces the mechanical stability of the polypropylene based resins so that for foaming applications usually polypropylene based resins which high melt strength (so called HMS polypropylene based resins) are used.

EP 3 127 951 A1 discloses a polypropylene composition suitable for foamed sheets and articles which comprises as the main component a high melt strength (HMS) polypropylene together with a nucleating agent.

HMS polypropylene is usually prepared using a rather cost extensive extrusion process in which a polypropylene resin is reacted with a thermally decomposed free radical-forming agent and either bifunctionally unsaturated low molecular weight monomers or multifunctionally unsaturated low molecular weight polymers in order to introduce branching into the originally linear polypropylene resin as e.g. disclosed in EP 0 787 750, EP 0 879 830 or EP 0 890 612.

Thus, there is a need for cost sensitive polypropylene compositions suitable for the production of foams having a good mechanical stability so that these foams can be used in thermoforming applications such as containers. Especially, since the HMS polypropylene, although suitable for foaming applications, are costly, a low cost alternative is desired. Foaming is generally unsuccessful with low melt strength polypropylenes as the foamed compositions have poor mechanical properties.

It has surprisingly been found that polypropylene compositions comprising a linear propylene homopolymer and a minor amount of low density polyethylene can be used for such applications.

SUMMARY OF THE INVENTION

The present invention relates to a foamed polypropylene composition comprising
(A) from 60.0 to 95.0 wt % of a linear propylene homopolymer and
(B) from 5.0 to 40.0 wt % of a low density polyethylene, based on the total weight of the polypropylene composition,
wherein the polypropylene composition before foaming has a melt flow rate $MFR_2$ of from 0.1 to 5.0 g/10 min, determined according to ISO 1133 at a load of 2.16 kg and a temperature of 230° C., and a $F_{30}$ melt strength of from 0.1 to 2.0 cN, determined according to ISO 16790:2005.

Further, the present invention relates to a sheet comprising said foamed polypropylene composition as defined above or below.

Still further, the present invention relates to process for producing said sheet as defined above or below comprising the steps of:
a) preparing a polypropylene composition by blending from 60.0 to 95.0 wt % of a linear propylene homopolymer (A) and from 5.0 to 40.0 wt % of a low density polyethylene (B), based on the total weight of the polypropylene composition;
b) subjecting the polypropylene composition to a foaming process;
c) forming the foamed polypropylene composition into a foamed sheet.

Additionally, the present invention relates to an article comprising said sheet as defined above or below.

Finally, the present invention relates to the use of said foamed polypropylene composition as defined above or below or said sheet as defined above or below for the production of an article.

Definitions

A propylene homopolymer is a polymer that essentially consists of propylene monomer units. Due to impurities especially during commercial polymerization processes, a propylene homopolymer can comprise up to 0.1 mol % comonomer units, preferably up to 0.05 mol % comonomer units and most preferably up to 0.01 mol % comonomer units.

A high melt strength (HMS) propylene polymer is branched and, thus, differs from a linear propylene polymer in that the polypropylene backbone covers side chains whereas a non-branched polypropylene, i.e. a linear polypropylene, does not cover side chains. The side chains have significant impact on the rheology of the polypropylene. Accordingly linear polypropylenes and high melt strength polypropylenes can be clearly distinguished by their flow behaviour under stress. A high melt strength propylene polymer generally has a $F_{30}$ melt strength of more than 20.0 cN at a $v_{30}$ melt extensibility of more than 150 mm/s whereas a linear propylene polymer has a lower $F_{30}$ melt strength and $v_{30}$ melt extensibility.

A linear low density polyethylene (LDPE) is characterized in being polymerized in a high pressure radical process.

FIGURES

DETAILED DESCRIPTION OF THE INVENTION

Foamed Polypropylene Composition

Figure 1:
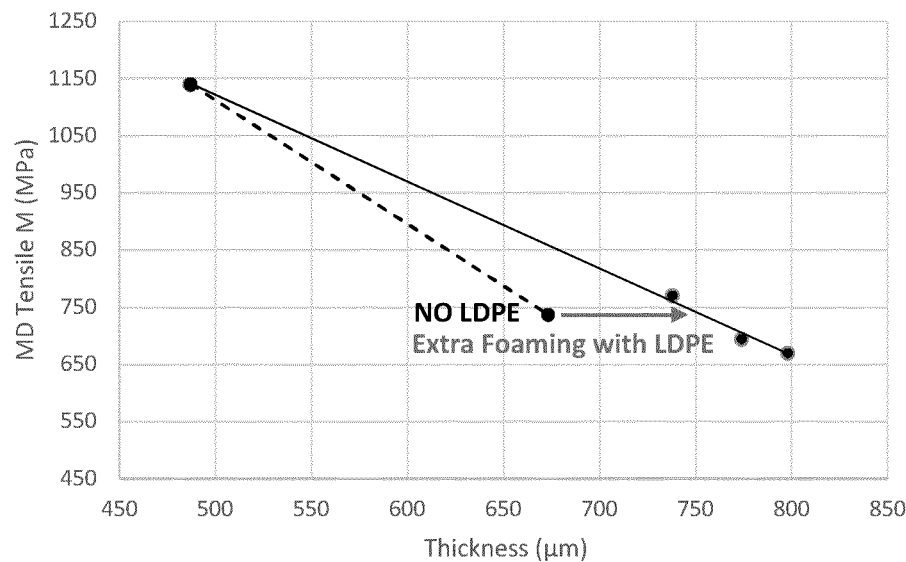
FIG. 1 shows the MD tensile modulus of the foamed sheets 1-4 as a function of the thickness of the foamed sheet.

The present invention relates to a foamed polypropylene composition comprising (A) from 60.0 to 95.0 wt % of a linear propylene homopolymer and (B) from 5.0 to 40.0 wt % of a low density polyethylene, based on the total weight of the polypropylene composition, wherein the polypropylene composition before foaming has a melt flow rate $MFR_2$ of from 0.1 to 5.0 g/10 min, determined according to ISO 1133 at a load of 2.16 kg and a temperature of 230° C., and a $F_{30}$ melt strength of from 0.1 to 2.0 cN, determined according to ISO 16790:2005.

The foamed polypropylene composition preferably comprises from 65.0 to 92.5 wt %, more preferably from 70.0 wt % to 90.0 wt % and most preferably from 75.0 wt % to 87.5 wt % of a linear propylene homopolymer (A), based on the total weight of the polypropylene composition.

Further, the foamed polypropylene composition preferably comprises from 7.5 to 35.0 wt %, more preferably from 10.0 wt % to 30.0 wt % and most preferably from 12.5 wt % to 25.0 wt % of a low density polyethylene (B), based on the total weight of the polypropylene composition.

The weight ratio of the linear propylene homopolymer (A) to the low density polyethylene (B) in the foamed polypropylene composition is preferably from 60.0:40.0 to 95.0:5.0, more preferably from 65.0:35.0 to 92.5:7.5, still more preferably from 70.0:30.0 to 90.0:10.0 and most preferably from 75.0:25.0 to 87.5:12.5.

The foamed polypropylene composition can further comprise a nucleating agent (C).

Nucleating agents can be added to foamed polypropylene compositions in order to control the size of foam cells.

The nucleating agent (C) is preferably a polymeric nucleating agent, more preferably an alpha-nucleating agent, e.g. a polymeric alpha-nucleating agent.

The nucleating agent (C) content of the foamed polypropylene composition, or of one of its components, preferably of the foamed polypropylene composition, is preferably up to 5.0 wt.-%. In a preferred embodiment, the foamed polypropylene composition or of one of its components, preferably of the foamed polypropylene composition, contains not more than 3000 ppm, more preferably of 1 to 2000 ppm of a nucleating agent (C), more preferably of an alpha-nucleating agent (C) in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, vinylcycloalkane polymer, vinylalkane polymer, and mixtures thereof.

It is preferred that the foamed polypropylene composition or one of its components contains a vinylcycloalkane, like vinylcyclohexane (VCH), polymer and/or vinylalkane polymer, as the preferable alpha-nucleating agent. Preferably in this embodiment the foamed polypropylene composition contains a vinylcycloalkane, like vinylcyclohexane (VCH), polymer and/or vinylalkane polymer, preferably vinylcyclohexane (VCH).

The nucleating agent (C) can be introduced as a masterbatch. Alternatively some alpha-nucleating agents as defined in the present invention, can be also introduced by BNT-technology as described below.

The nucleating agent may be introduced to the polypropylene (PP) or one of its components e.g. during the polymerisation process of the polypropylene (PP) or one of its components or may be incorporated to the propylene copolymer in the form of masterbatch (MB) together with e.g. a carrier polymer.

In case of the embodiment of a masterbatch incorporation the masterbatch contains a nucleating agent, which is preferably a polymeric nucleating agent, more preferably alpha-nucleating agent, most preferably a vinylcycloalkane, like vinylcyclohexane (VCH), polymer and/or vinylalkane polymer, preferably vinylcyclohexane (VCH) polymer, as defined above or below, in an amount of not more than 500 ppm, more preferably of 1 to 200 ppm, and still more preferably of 5 to 100 ppm, based on the weight of the masterbatch (100 wt. %). In this embodiment, more preferably, said masterbatch is present in an amount of not more than 10.0 wt.-%, more preferably not more than 5.0 wt.-% and most preferably not more than 3.5 wt.-%, with the preferred amount of masterbatch (MB) being from 1.5 to 3.5 wt.-%, based on the total amount of the polypropylene (PP). Most preferably the masterbatch comprises, preferably consists of the homopolymer or copolymer, preferably homopolymer, of propylene which has been nucleated according to BNT-technology as described below.

It is preferred that the nucleating agent is introduced to the foamed polypropylene composition during the polymerisation process of the linear propylene homopolymer (A). The nucleating agent is preferably introduced to the linear propylene homopolymer (A) by first polymerising the above defined vinyl compound, preferably vinylcycloalkane, as defined above or below, in the presence of a catalyst system comprising a solid catalyst component, preferably a solid Ziegler Natta catalyst component, a cocatalyst and optional external donor, and the obtained reaction mixture of the polymer of the vinyl compound, preferably vinyl cyclohexane (VCH) polymer, and the catalyst system is then used for producing the linear propylene homopolymer (A). The above incorporation of the polymeric nucleating agent to the polypropylene (PP) during the polymerization of said propylene copolymer is called herein as BNT-technology as described below.

Said obtained reaction mixture is herein below referred interchangeably as modified catalyst system.

Preferably the vinylcycloalkane is vinylcyclohexane (VCH) polymer which is introduced into the linear propylene homopolymer (A) by the BNT technology.

More preferably in this preferred embodiment, the amount of vinylcycloalkane, like vinylcyclohexane (VCH), polymer and/or vinylalkane polymer, more preferably of vinylcyclohexane (VCH) polymer, in the linear propylene homopolymer (A), is not more than 500 ppm, more preferably of 1 to 200 ppm, most preferably 5 to 100 ppm.

With regard to the BNT-technology reference is made to the international applications WO 99/24478, WO 99/24479 and particularly WO 00/68315. According to this technology a catalyst system, preferably a Ziegler-Natta procatalyst, can be modified by polymerising a vinyl compound in the presence of the catalyst system, comprising in particular the special Ziegler-Natta procatalyst, an external donor and a cocatalyst, which vinyl compound has the formula:

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the linear propylene homopolymer (A). The polymerized vinyl compound acts as an alpha-nucleating agent. The weight ratio of vinyl compound to solid catalyst component in the modification step of the catalyst is preferably of up to 5 (5:1), preferably up to 3 (3:1) most preferably from 0.5 (1:2) to 2 (2:1). The most preferred vinyl compound is vinylcyclohexane (VCH).

The foamed polypropylene composition can further comprise a foaming agent (D). The foaming agent used in the foaming of the polypropylene composition invention is not limited to any class or type. It can be chemical blowing agents, or physical blowing agents of either hydrocarbon and/or inorganic types, combination of either types and/or both types or carbon dioxide.

In case of a physical foaming agent the foaming agent can be gaseous or liquid an aliphatic organic solvent having 3 to 10, preferably 3 to 8 carbon atoms such as butane, mixtures of butane and propane, or a gaseous foaming agent such as HFC or $CO_2$.

A chemical foaming agent can be organic or inorganic compounds that release gasses upon thermal decomposition.

Physical foaming agents are usually added to the polymeric melt in gaseous or liquid form.

Chemical foaming agents are can be added to the polymeric melt as a single component or in form of a masterbatch in which the foaming agent is mixed with a carrier resin in concentrated form. When using a masterbatch the weight amount of the carrier resin is generally calculated to the amount of foaming agent (D).

The foaming agent is preferably present in the polypropylene composition before foaming in an amount of from 0.1 to 7.5 wt %, more preferably from 0.5 to 5.0 wt %, based on the total amount of the polypropylene composition before foaming.

The foamed polypropylene composition preferably has a density after foaming of from 300 to 700 kg/m³, preferably from 325 to 650 kg/m³, and most preferably from 350 to 600 kg/m³.

The density reduction of the foamed polypropylene composition after foaming compared to the unfoamed polypropylene composition is at least 10%, more preferably at least 15% and most preferably at least 20%.

Usually the density reduction is not higher than 50%, more preferably not higher than 40%.

The foamed polypropylene composition preferably comprises the linear propylene homopolymer (A), the low density polyethylene (B), and optionally the nucleating agent (C) and the foaming agent (D) in the above described amounts.

It is especially preferred that the foamed polypropylene composition preferably comprises the linear propylene homopolymer (A), the low density polyethylene (B), the nucleating agent (C) and the foaming agent (D) in the above described amounts.

The foamed polypropylene composition can further comprise additives such as stabilizers such as antioxidants (e.g. sterically hindered phenols, phosphites/phosphonites, sulphur containing antioxidants, alkyl radical scavengers, aromatic amines, hindered amine stabilizers, or blends thereof), metal deactivators (e.g. Irganox MD 1024), or UV stabilizers (e.g. hindered amine light stabilizers). Other typical additives are modifiers such as antistatic or antifogging agents (e.g. ethoxylated amines and amides, or glycerol esters), acid scavengers, blowing agents, cling agents (e.g. polyisobutene), lubricants and resins (ionomer waxes, PE- and ethylene copolymer waxes, Fischer-Tropsch waxes, Montan-based waxes, Fluoro-based compounds, or paraffin waxes), as well as slip and antiblocking agents (e.g. Ca-stearate, erucamide, oleamide, talc natural silica and synthetic silica, or zeolites). Preferably the additives are selected from the group consisting of antioxidants (e.g. sterically hindered phenols, phosphites/phosphonites, sulphur containing antioxidants, alkyl radical scavengers, aromatic amines, hindered amine stabilizers, or blends thereof), metal deactivators (e.g. Irganox MD 1024), UV stabilizers (e.g. hindered amine light stabilizers), antistatic or antifogging agents (e.g. ethoxylated amines and amides, or glycerol esters), acid scavengers, blowing agents, cling agents (e.g. polyisobutene), lubricants and resins (ionomer waxes, PE- and ethylene copolymer waxes, Fischer-Tropsch waxes, Montan-based waxes, Fluoro-based compounds, or paraffin waxes), slip agents (e.g. Ca-stearate), antiblocking agents (e.g. erucamide, oleamide, talc natural silica and synthetic silica, or zeolites) and mixtures thereof.

Preferable additives are slip agents, such as for example Ca-stearate.

Typically the total amount of additives is not more than 15 wt.-%, more preferably not more than 10 wt.-%, like in the range of 0.1 to 10 wt.-%, preferably 0.1 to 5 wt. %, more preferably 0.2 to 1 wt. % based on the total weight of the foamed polypropylene composition.

It is preferred that the foamed polypropylene composition consists of the linear propylene homopolymer (A), the low density polyethylene (B), and optionally the nucleating agent (C), the foaming agent (D) and the additives.

The foamed polypropylene composition has a melt flow rate $MFR_2$ of from 0.1 to 5.0 g/10 min, preferably of from 0.2 to 4.5 g/10 min and most preferably of from 0.5 to 4.0 g/10 min, determined according to ISO 1133 at a temperature of 230° C. and a load of 2.16 kg.

Further, the foamed polypropylene composition has a $F_{30}$ melt strength of from 0.1 to 2.0 cN, preferably of from 0.2 to 1.8 cN and most preferably of from 0.5 to 1.5 cN, determined according to ISO 16790:2005.

Still further, the foamed polypropylene composition preferably has a $v_{30}$ melt extensibility of less than 150 mm/s, more preferably of less than 125 mm/s and most preferably of less than 100 mm/s, determined according to ISO 16790: 2005.

The linear propylene homopolymer (A) preferably has a melt flow rate MFR$_2$, measured according to ISO 1133 at a temperature of 230° C. and a load of 2.16 kg, in the range of 0.5 to 6.0 g/10 min, more preferably in the range of 1.0 to 5.5 g/10 min, and most preferably in the range of 2.0 to 5.0 g/10 min.

Further, the linear propylene homopolymer (A) preferably has a melting temperature T$_m$ in the range of at least 140° C., preferably in the range of 140 to 170° C., more preferably in the range of 150 to 170° C., like in the range of 155 to 170° C., determined according to ISO 11357/03.

The linear propylene homopolymer (A) preferably features a low amount of xylene cold solubles (XCS), i.e. of ≤4.0 wt.-%, preferably in the range from 0.1 to 4.0 wt.-%, more preferably in the range from 0.1 to 3.0 wt.-% and most preferably in the range from 0.1 to 2.5 wt.-%.

The linear propylene homopolymer (A) is preferably an isotactic propylene homopolymer. Accordingly, it is appreciated that the linear propylene homopolymer (A) has a rather high isotactic pentad concentration, i.e. higher than 90 mol-%, more preferably higher than 92 mol-%, still more preferably higher than 93 mol-% and yet more preferably higher than 95 mol-%, like higher than 97 mol-%.

The linear propylene homopolymer (A) is state of the art and commercial available. A suitable linear propylene homopolymer is for instance HC205TF of Borouge Pte Ltd.

The linear propylene homopolymer (A) can be polymerized using any suitable polymerization process in the presence of a polymerization catalyst.

The polymerization can be conducted in one polymerization reactor or in a sequential multistage polymerization reactor such as two or more polymerization reactors (R1) and (R2) arranged in series.

The polymerization reactor (R1) can be a gas phase reactor (GPR) or a slurry reactor (SR). A gas phase reactor (GPR) according to this invention is preferably a fluidized bed reactor, a fast fluidized bed reactor or a settled bed reactor or any combination thereof.

Preferably, the polymerization reactor (R1) is a slurry reactor (SR) which can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second polymerization reactor (R2) and any subsequent reactor, if present, are preferably gas phase reactors (GPRs). Such gas phase reactors (GPR) can be any mechanically mixed or fluid bed reactors. Preferably the gas phase reactors (GPRs) comprise a mechanically agitated fluid bed reactor with gas velocities of at least 0.2 m/sec. Thus it is appreciated that the gas phase reactor is a fluidized bed type reactor preferably with a mechanical stirrer.

If any subsequent reactor is present, the propylene homopolymer of the first polymerization reactor (R1), is preferably directly fed into the second polymerization reactor (R2), i.e. into the (first) gas phase reactor (GPR1), without a flash step between the stages. This kind of direct feed is described in EP 887379 A, EP 887380 A, EP 887381 A and EP 991684 A. By "direct feed" is meant a process wherein the content of the first polymerization reactor (R1), i.e. of the loop reactor (LR), is led directly to the next stage gas phase reactor.

Alternatively, the propylene homopolymer of the first polymerization reactor (R1), more preferably polymer slurry of the loop reactor (LR), may be also directed into a flash step or through a further concentration step before fed into the second polymerization reactor (R2), i.e. into the gas phase reactor (GPR). Accordingly, this "indirect feed" refers to a process wherein the content of the first polymerization reactor (R1), of the loop reactor (LR), i.e. the polymer slurry, is fed into the second polymerization reactor (R2), into the (first) gas phase reactor (GPR1), via a reaction medium separation unit and the reaction medium as a gas from the separation unit.

However, it is preferred that the propylene polymer (PP1) is prepared in one reactor, i.e. the polymerization reactor (R1) being a loop reactor (LR).

If needed prior to the slurry reactor (SR), i.e. the loop reactor (LR), a pre-polymerization reactor is placed.

The Ziegler-Natta catalyst is fed into the polymerization reactor (R1). If the process covers also a pre-polymerization step it is preferred that all of the Ziegler-Natta catalyst is fed in the pre-polymerization reactor. Subsequently the pre-polymerization product containing the Ziegler-Natta catalyst is transferred into the polymerization reactor (R1).

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

Accordingly it is preferred that the operating temperature in the polymerization reactor (R1), preferably in the loop reactor (LR), is in the range of 62 to 90° C., more preferably in the range of 65 to 85° C., still more preferably in the range of 67 to 83° C.

Typically the pressure in the polymerization reactor (R1), preferably in the loop reactor (LR), is in the range from 20 to 80 bar, preferably 30 to 70 bar, like 35 to 65 bar.

Further, it is preferred that the operating temperature in the polymerization reactor (R2), preferably in the gas phase reactor (GPR), is in the range of 60 to 115° C., e.g. 70 to 110° C., more preferably in the range of 70 to 110° C., still more preferably in the range of 75 to 105° C.

Typically the pressure in the polymerization reactor (R2), preferably in the gas phase reactor (GPR), is in the range from 10 to 30 bar, preferably 12 to 27 bar, like 15 to 25 bar.

Preferably hydrogen is added in each polymerization reactor in order to control the molecular weight, i.e. the melt flow rate MFR$_2$.

The linear propylene homopolymer (A) is preferably prepared by a sequential polymerisation process, as described above, in the presence of a catalyst system comprising a Ziegler-Natta catalyst, a cocatalyst and optionally an external donor.

The Ziegler Natta catalyst is preferably a solid Ziegler-Natta catalyst (ZN-C), which comprises compounds (TC) of a transition metal of Group 4 to 6 of IUPAC, like titanium, a Group 2 metal compound (MC), like a magnesium, and an internal donor (ID), preferably being a non-phthalic compound, preferably a non-phthalic acid ester, still more preferably being a diester of non-phthalic dicarboxylic acids as described in more detail below. Thus, the catalyst is in a preferred embodiment fully free of undesired phthalic compounds. Further, the solid catalyst is free of any external support material, like silica or MgCl$_2$, but the catalyst is self-supported.

Detailed description of preparation of suitable Ziegler-Natta catalysts is disclosed in WO 2012/007430, EP2610271, EP 261027 and EP2610272 which are incorporated here by reference.

The optional external donor (ED) can include certain silanes, ethers, esters, amines, ketones, heterocyclic compounds and blends of these. It is especially preferred to use a silane.

In addition to the Ziegler-Natta catalyst (ZN-C) and the optional external donor (ED) a co-catalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst (Co) is a trialkylaluminum, like triethylaluminium (TEAL), dialkyl aluminium chloride or alkyl aluminium dichloride or mixtures thereof. In one specific embodiment the co-catalyst (Co) is triethylaluminium (TEAL).

The Ziegler-Natta catalyst (ZN-C) is preferably modified by the so called BNT-technology during the above described pre-polymerisation step in order to introduce the polymeric nucleating agent.

Such a polymeric nucleating agent is as described above a vinyl polymer, such as a vinyl polymer derived from monomers of the formula

CH2=CH—CHR1R2 wherein R1 and R2, together with the carbon atom they are attached to, form an optionally substituted saturated or unsaturated or aromatic ring or a fused ring system, wherein the ring or fused ring moiety contains four to 20 carbon atoms, preferably 5 to 12 membered saturated or unsaturated or aromatic ring or a fused ring system or independently represent a linear or branched C4-C30 alkane, C4-C20 cycloalkane or C4-C20 aromatic ring. Preferably R1 and R2, together with the C-atom wherein they are attached to, form a five- or six-membered saturated or unsaturated or aromatic ring or independently represent a lower alkyl group comprising from 1 to 4 carbon atoms. Preferred vinyl compounds for the preparation of a polymeric nucleating agent to be used in accordance with the present invention are in particular vinyl cycloalkanes, in particular vinyl cyclohexane (VCH), vinyl cyclopentane, and vinyl-2-methyl cyclohexane, 3-methyl-1-butene, 3-ethyl-1-hexene, 3-methyl-1-pentene, 4-methyl-1-pentene or mixtures thereof. VCH is a particularly preferred monomer.

The weight ratio of vinyl compound to polymerisation catalyst in the modification step of the polymerisation catalyst preferably is 0.3 or more up to 40, such as 0.4 to 20 or more preferably 0.5 to 15, like 0.5 to 2.0.

The ethylene polymer used in the foamed polypropylene composition of the present invention is a low density ethylene polymer (LDPE) (B). Low density ethylene polymers contain long chain branches and are thus different from linear copolymers of ethylene and alpha-olefin comonomers produced in the presence of a Ziegler or a metallocene catalyst. Especially, the presence of the long chain branches causes clear differences in the rheological behaviour of the polymer.

The meaning of low density polyethylene (LDPE) is well known and documented in the literature. Although the term LDPE is an abbreviation for low density polyethylene, the term is understood not to limit the density range, but covers the high pressure polyethylenes (HP polyethylene) with low, medium and higher densities produced by radical polymerization process using free radical initiators. Autoclave and tubular reactors are typically used in HP ethylene polymerization process. The term LDPE describes and distinguishes only the nature of HP polyethylene with typical features, such as different branching architecture, compared to the polyethylene produced in the presence of an olefin polymerization catalyst. Moreover, said low density polyethylene (LDPE), preferably the low density polyethylene (LDPE) homopolymer, may be unsaturated.

In case the low density polyethylene (LDPE) is a copolymer, it comprises comonomers, typically selected from, but not restricted to, acrylates, acrylic acids, methacrylates, methacrylic acids and acetates.

Low density polyethylenes (LDPE) consist of chain molecules of many different lengths causing distribution of molecular length or molecular weight (MWD). MWD is the ratio of weight average molecular weight (Mw) and number average molecular weight (Mn), thus MWD is Mw/Mn. Polyethylenes used in the present invention can be unimodal or multimodal as re to the form of its molecular weight distribution (MWD) curve, i.e. the appearance of the graph of the polymer weight fraction as a function of its molecular weight. If the polymer is produced in the sequential step process, i.e. by utilizing reactors coupled in series, and using different conditions in each reactor, the different polymer fractions produced in the different reactors each have their own molecular weight distribution which may considerably differ from one another and as a result a bi- or multimodal polymer is produced. Unimodal polymers have no such bi- or multimodal appearance of molecular weight maximums. Low density polyethylenes to be used in extrusion coating applications have broad MWD due to the branched structure of the polymers.

The LDPE (B) is preferably produced in a high pressure tubular reactor.

The density of the LDPE (B) used in the present invention is preferably in the range of 915 to 930 kg/m³, more preferably in the range of 918 to 928 kg/m³ and most preferably in the range of 920 to 925 kg/m³, determined according to ISO 1183D.

The melt flow rate $MFR_2$, measured according to ISO 1133 at a temperature pf 190° C. and a load of 2.16 kg, of the LDPE (B) is of from 0.1 to 2.0 g/10 min, preferably from 0.2 to 1.5 g/10 min and in particular from 0.5 to 1.0 g/10 min.

Further, the LDPE (B) preferably has a melting temperature Tm in the range of 90 to 150° C., more preferably in the range of 100 to 140° C., like in the range of 105 to 130° C., determined according to ISO 11357/03.

The Foam

The present invention also features a foam comprising the instant polypropylene composition described herein. Preferably the foam comprises at least 70 wt.-%, more preferably at least 80 wt.-%, more preferably at least 90 wt.-%, yet more preferably at least 95 wt.-%, of the polypropylene composition according to the instant invention. In a preferred embodiment the foam consists of the instant polypropylene composition (apart from the foaming agents if still present in the foam after the foaming process).

The density of the foam is preferably 300 to 700 kg/m³, preferably from 325 to 650 kg/m³, and most preferably from 350 to 600 kg/m³.

The density reduction of the foam to the unfoamed polypropylene composition is at least 10%, more preferably at least 15% and most preferably at least 20%. Usually the density reduction is not higher than 50%, more preferably not higher than 40%.

The Foamed Sheet

Further, the present invention relates to a sheet comprising said foamed polypropylene composition as defined above or below.

The sheet preferably has a thickness of from 175 µm to 1400 µm, more preferably from 250 µm to 1250 µm and most preferably from 400 µm to 1000 µm.

Further, the sheet preferably has a density of 300 to 700 kg/m³, preferably from 325 to 650 kg/m³, and most preferably from 350 to 600 kg/m³.

The sheet preferably is a multilayer sheet comprising at least two layers, more preferably at least three layers.

It is preferred that at least one layer, more preferably only one layer, of the multilayer sheet is foamed and comprises the foamed polypropylene composition according to the invention.

Preferably the at least one foamed layer, more preferably the single foamed layer, is a core layer (CL) which is sandwiched between at least two skin layers (SL) in adherent contact with both sides of the core layer in the configuration SL-CL-SL.

It is especially preferred that the multilayer sheet consists of three layers in said configuration SL-CL-SL, wherein the core layer comprises the foamed polypropylene composition according to the invention.

The skin layers (SL) preferably comprise an unfoamed polypropylene composition. Said unfoamed polypropylene composition preferably comprises the linear propylene homopolymer (A) as defined above or below in an amount of at least 95 wt %. The unfoamed polypropylene composition is preferably free of a foaming agent.

The core layer (CL) preferably has a thickness of from 75 µm to 1000 µm, more preferably of from 100 µm to 800 µm and most preferably of from 250 µm to 750 µm after foaming.

The skin layers (SL) independently preferably have a thickness of from 50 µm to 200 µm, more preferably of from 60 µm to 175 µm and most preferably of from 70 µm to 150 µm.

The Article

The present invention is furthermore directed to an article comprising the foamed polypropylene composition or the sheet according to the present invention, the article preferably comprising the sheet according to the present invention.

The article may be a container, e.g. a bottle, a cup, a can, a canister, a bowl or a tray; a sleeve, e.g. for a container; a lid, e.g. for a container; a film; a blank; a pad; a carrier; a tube; a substrate; a pipe; a vessel; a panel, e.g. a construction panel; a liner, e.g. a truck liner; a tape; a roll or a profile.

The article is preferably a container.

The container may, for example, be a bottle, a cup, a can, a canister a bowl or a tray.

By using the sheet of the present invention as cup body excellent thermal insulation properties, e.g. in case of cold and hot beverages are obtained. Moreover, the uptake of liquid into the cup is minimal as the cover layer is located on the inside of the cup thereby sealing the pores of the foamed sheet from the liquid inside the cup. The foamed sheet according to the present invention further has good printability thereby eliminating the need of specific layers on the outside therefor.

Said article is preferably produced by thermoforming.

Further, the present invention relates to the use of said foamed polypropylene composition as defined above or below or said sheet as defined above or below for the production of an article such as the article as defined above or below.

Process

Further, the present invention relates to process for producing said sheet as defined above or below comprising the steps of:

a) preparing a polypropylene composition by blending from 60.0 to 95.0 wt % of a linear propylene homopolymer (A) and from 5.0 to 40.0 wt % of a low density polyethylene (B), based on the total weight of the polypropylene composition;
b) subjecting the polypropylene composition to a foaming process;
c) forming the foamed polypropylene composition into a foamed sheet.

The polypropylene composition is preferably formed in an extruder. During said extrusion step optional nucleating agents and additives can be added to the polypropylene composition.

The polypropylene composition is then subjected to a foaming process, preferably in the presence of a foaming agent (D).

The foaming process is in the skilled knowledge. In such a process, a melt of the instant polypropylene composition comprising a foaming agent (D) as described above or below is suddenly expanded through pressure drop.

Continuous foaming processes as well as discontinuous process may be applied. In a continuous foaming process, the polypropylene composition is melted and laden with the foaming agent in an extruder under pressures typically above 20 bar before being extruded through a die where the pressure drop causes the formation of a foam. The mechanism of foaming polypropylene in foam extrusion is explained, for example, in H. E. Naguib, C. B. Park, N. Reichelt, Fundamental foaming mechanisms governing the volume expansion of extruded polypropylene foams, Journal of Applied Polymer Science, 91, 2661-2668 (2004). Processes for foaming are outlined in S. T. Lee, Foam Extrusion, Technomic Publishing (2000). In a discontinuous foaming process, the polypropylene composition (micro-) pellets are laden with foaming agent under pressure and heated below melting temperature before the pressure in the autoclave is suddenly relaxed. The dissolved foaming agent forms bubbles and creates a foam structure. The preparation of discontinuously foamed beads is described for example in DE 3 539 352.

The amount of foaming agent is usually below 10 wt. % based on the total weight of the polymer composition and the foaming agent, preferably below 5 wt. % based on the total weight of the polymer composition and the foaming agent.

As outlined above, preferably a foamed sheet is formed.

The foamed sheet can be prepared using a cast sheet line or a calendaring line.

For producing a multilayer sheet as described above and below the foamed polypropylene composition is preferably coextruded together with one or more, more preferably two or more polypropylene compositions in order to produce a coextruded multilayer sheet.

Thereby, the foamed polypropylene composition is preferably extruded as core layer (CL) together with two or more, more preferably two unfoamed polypropylene compositions as skin layers (SL) in the coextruded configuration SL-CL-SL as described above or below.

In cast sheet lines the polymeric melt is usually guided through a flat die system by which the sheet is formed to a cooling unit.

The cooling unit usually comprises one or more chill rolls, preferably two chill rolls. The temperature of the chill roll(s) is preferably independently in the range of from 10 to 40° C., more preferably from 15 to 30° C. When two chill rolls are present the second chill roll usually has the same or a lower temperature compared to the first chill roll.

In a calendaring sheet line the polymeric melt is usually guided from the extruder section through a flat die to a multitude of cylindrical rollers in which the sheet is formed.

The multitude of cylindrical rollers can have several configurations through which the sheet is guided such as an I type form of three or more rollers or an L type form of four or more rollers. The rollers further can be arranged in an angle towards the die. The die additionally can be arranged at different angles towards the roller system.

The calendaring machine preferably comprises from 3 to 6 cylindrical rollers, more preferably 4 cylindrical rollers.

Figure 5:
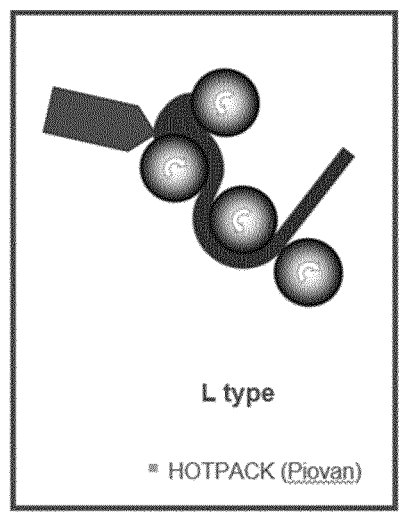
FIG. 5 shows the principle configuration of the L type calendar sheet line with angular calendaring and die configuration used for the preparation of the foamed sheets 5 and 6.

Preferably an L configuration with angular calendaring and die configuration as shown in FIG. 5 is used in the calendaring process form producing the sheet according to the invention.

For optimizing the calendaring process for preparing the sheet of the invention several improving measures have been found:

The temperature of the multitude of cylindrical rollers is preferably maintained in the range of from 15 to 25° C.

The pressure on the melts after the first of the multitude of cylindrical rollers in proximity to the die is preferably reduced to less than 150 bar. This can be achieved e.g. by increasing the rotating speed of the multitude of cylindrical rollers or by <increasing the gap between the multitude of cylindrical rollers as such that the sheet only touches one cylindrical roller at the time.

The distance between the die and the first cylindrical roller of the multitude of cylindrical rollers is preferably reduced to less than 100 mm, more preferably less than 80 mm and most preferably less than 50 mm.

Examples

1. Determination Methods a) Melt Flow Rate

The melt flow rate is determined according to ISO 1133. For propylene based resins the melt flow rate is determined at a temperature of 230° C. whereas for ethylene based resins the melt flow rate is determined at a temperature of 190° C. $MFR_2$ means the melt flow rate at a load of 2.16 kg.

b) Density

All densities are measured according to ISO 1183D. Sample preparation is done by compression moulding in accordance with ISO 1872-2:2007.

c) $F_{30}$ Melt Strength and $v_{30}$ Melt Extensibility

The test described herein follows ISO 16790:2005.

The strain hardening behaviour is determined by the method as described in the article "Rheotens-Mastercurves and Drawability of Polymer Melts", M. H. Wagner, Polymer Engineering and Science, Vol. 36, pages 925 to 935. The content of the document is included by reference. The strain hardening behaviour of polymers is analysed by Rheotens apparatus (product of Gottfert, Siemensstr. 2, 74711 Buchen, Germany) in which a melt strand is elongated by drawing down with a defined acceleration.

The Rheotens experiment simulates industrial spinning and extrusion processes. In principle a melt is pressed or extruded through a round die and the resulting strand is hauled off. The stress on the extrudate is recorded, as a function of melt properties and measuring parameters (especially the ratio between output and haul-off speed, practically a measure for the extension rate). For the results presented below, the materials were extruded with a lab extruder HAAKE Polylab system and a gear pump with cylindrical die (L/D=6.0/2.0 mm). The gear pump was pre-adjusted to a strand extrusion rate of 5 mm/s, and the melt temperature was set to 200° C. The spinline length between die and Rheotens wheels was 80 mm. At the beginning of the experiment, the take-up speed of the Rheotens wheels was adjusted to the velocity of the extruded polymer strand (tensile force zero): Then the experiment was started by slowly increasing the take-up speed of the Rheotens wheels until the polymer filament breaks. The acceleration of the wheels was small enough so that the tensile force was measured under quasi-steady conditions. The acceleration of the melt strand drawn down is 120 mm/sec². The Rheotens was operated in combination with the PC program EXTENS. This is a real-time data-acquisition program, which displays and stores the measured data of tensile force and drawdown speed. The end points of the Rheotens curve (force versus pulley rotary speed) is taken as the $F_{30}$ melt strength and drawability values.

d) Density of the Foam

This has been measured using an analytical and semi-micro precision balance of Switzerland PRECISA Gravimetrics AG, Switzerland, the specific gravity balance (XS225A); test method: application of Archimedes, automatically calculate the density of the sample.

e) Tensile Properties

Tensile modulus, tensile stress at break, tensile strain at break, tensile stress at yield and tensile strain at yield were measured on the foamed sheets as prepared below in machine direction (MD) and transverse direction (TD) according to ISO 527-3.

2. Materials

For the foamed polypropylene compositions the following resins were used:

HC205TF is a BNT nucleated linear propylene homopolymer having a density of 900 to 910 kg/m³ and a melt flow rate $MFR_2$ (230° C., 2.16 kg) of 4 g/10 min. HC205TF is commercially available from Borouge Pte Ltd.

FT5230 is a low density polyethylene having a density of 923 kg/m³ and a melt flow rate $MFR_2$ (190° C., 2.16 kg) of 0.75 g/10 min. FT5230 is commercially available from Borouge Pte Ltd.

3. Preparation of Sheets and Thermoformed Articles a) Polypropylene Compositions For the polypropylene compositions according to the invention 85 wt % of HC205TF were blended with 25 wt % of FT5230.

For the comparative polypropylene compositions 100 wt % HC205TF was used in the polypropylene compositions.

The polypropylene compositions were compounded using a Coperion twin screw extruder ZSK 58 under the following conditions:

| | |
|---|---|
| Melt temperature | >220° C. |
| Extruder throughput | 150.0 kg/hr |
| Screw speed | 150.0 rpm |
| Screw torque | 55.0% |
| SEI | 172 kWh/ton | b) Preparation of Multi-Layer Foamed Sheets Using Cast Film Technology

Three layer sheets were prepared using the polypropylene compositions as described above under a) as core layer and HC250TF as skin layers in a cast sheet coextrusion line. The cast sheet coextrusion line includes three single screw extruders and has the the following dimensions:

| | |
|---|---|
| Screw diameter (mm) | 45/75/45 |
| Screw length (mm) | 28D/33D/28D |
| Flat die lip width (mm) | 1200 |
| Die gap (mm) | 0.5 to 1.0 |
| Output (kg/h) | 370 |
| Max. film width (mm) | 700 |
| Min. film thickness (μm) | 18 |
| Max film thickness (μm) | 250 |

For foaming chemical foaming agent masterbatch Hydrocerol CT3232, commercially available from Clariant, is added to the polypropylene compositions of the core layer in amounts of 3.8 wt % (sheets 1-3) and 4.0 wt % (sheet 4) of the total polypropylene composition during extrusion. No foaming agent was added to the HC250TF of the skin layers.

Four multi-layer sheets having a foamed core layer are produced under the conditions described below in Table 1:

TABLE 1

Conditions for producing multi-layer sheets in cast sheet line

| | Sheet 1 | Sheet 2 | Sheet 3 | Sheet 4 |
|---|---|---|---|---|
| Core layer | | | | |
| Composition | 85 wt % HC205TF + 25 wt % FT5230 | 85 wt % HC205TF + 25 wt % FT5230 | 85 wt % HC205TF + 25 wt % FT5230 | 85 wt % HC205TF + 25 wt % FT5230 |
| Foaming agent | 3.8 wt % CT3232 | 3.8 wt % CT3232 | 3.8 wt % CT3232 | 4.0 wt % CT3232 |
| Screw speed | 69 rpm | 82 rpm | | |
| Throughput | 85.8 kg/h | 97.3 kg/h | | |
| Screw yield | 20.7 g/rev | 19.8 g/rev | | |
| Melt pressure 1 | 142 bar | 147 bar | | |
| Melt pressure 2 | 71 bar | 74 bar | | |
| Heat zone lowest temp | 170° C. | 170° C. | 170° C. | 170° C. |
| Heat zone highest temp | 255° C. | 255° C. | 255° C. | 255° C. |
| Melt temp 1 | 246° C. | 246° C. | 246° C. | 246° C. |
| Melt temp 2 | 247° C. | 249° C. | 248° C. | 248° C. |
| Torque | 136 Nm | 143 Nm | 138 Nm | 140 Nm |
| Target gauge | 470 μm | 600 μm | 500 μm | 280 μm |
| Skin layer AK | | | | |
| Composition | 100 wt % HC205TF | 100 wt % HC205TF | 100 wt % HC205TF | 100 wt % HC205TF |
| Screw speed | 141 rpm | 119 rpm | 134 rpm | 136 rpm |
| Throughput | 37.0 kg/h | 31.4 kg/h | 35.4 kg/h | 35.7 kg/h |
| Screw yield | 4.4 g/rev | 4.4 g/rev | 4.4 g/rev | 4.4 g/rev |
| Melt pressure 1 | 156 bar | 145 bar | 155 bar | 153 bar |
| Melt pressure 2 | 116 bar | 108 bar | 114 bar | 114 bar |
| Heat zone lowest temp | 175° C. | 175° C. | 175° C. | 175° C. |
| Heat zone highest temp | 255° C. | 255° C. | 255° C. | 255° C. |
| Melt temp 1 | 247° C. | 247° C. | 247° C. | 246° C. |
| Melt temp 2 | 247° C. | 247° C. | 247° C. | 247° C. |
| Torque | 43 Nm | 40 Nm | 41 Nm | 43 Nm |
| Target gauge | 125 μm | 125 μm | 125 μm | 70 μm |
| Skin layer CR | | | | |
| Composition | 100 wt % HC205TF | 100 wt % HC205TF | 100 wt % HC205TF | 100 wt % HC205TF |
| Screw speed | 141 rpm | 118 rpm | 134 rpm | 135 rpm |
| Throughput | 37.1 kg/h | 31.2 kg/h | 35.5 kg/h | 35.4 kg/h |
| Screw yield | 4.4 g/rev | 4.4 g/rev | 4.4 g/rev | 4.4 g/rev |
| Melt pressure 1 | 166 bar | 153 bar | 163 bar | 159 bar |
| Melt pressure 2 | 114 bar | 105 bar | 111 bar | 111 bar |
| Heat zone lowest temp | 175° C. | 175° C. | 175° C. | 175° C. |

TABLE 1-continued

Conditions for producing multi-layer sheets in cast sheet line

| | Sheet 1 | Sheet 2 | Sheet 3 | Sheet 4 |
|---|---|---|---|---|
| Heat zone highest temp | 255° C. | 255° C. | 255° C. | 255° C. |
| Melt temp 1 | 255° C. | 255° C. | 255° C. | 254° C. |
| Melt temp 2 | 244° C. | 244° C. | 244° C. | 243° C. |
| Torque | 44 Nm | 40 Nm | 43 Nm | 43 Nm |
| Target gauge | 125 μm | 125 μm | 125 μm | 70 μm |
| Cast sheet line | | | | |
| Film total thickness | 720 μm | 850 μm | 750 μm | 420 μm |
| All extruders throughput | 159.9 kg/h | 159.9 kg/h | 160.0 kg/h | 160.3 kg/h |
| Feedblock highest temp | 255° C. | 255° C. | 255° C. | 255° C. |
| Die Zone highest temp | 255° C. | 255° C. | 255° C. | 261° C. |
| Chill roll 1 speed | 5.1 m/min | 4.4 m/min | 4.9 m/min | 8.8 m/min |
| Chill roll 1 torque | −34.1 Nm | −31.7 Nm | −34.1 Nm | −38.7 Nm |
| Chill roll 1 temp | 23° C. | 26° C. | 26° C. | 29° C. |
| Chill roll 2 speed | 5.1 m/min | 4.4 m/min | 4.9 m/min | 8.9 m/min |
| Chill roll 2 torque | 71.8 Nm | 66.3 Nm | 68.0 Nm | 77.6 Nm |
| Chill roll 2 temp | 20° C. | 20° C. | 20° C. | 21° C. |
| Airknife position, hor | 1390 mm | 1389 mm | 1392 mm | 1395 mm |
| Airknife position, ver | 100 mm | 100 mm | 100 mm | 100 mm |
| Airknife position, ang | 102° | 102° | 102° | 102° |
| Airknife power | 30 Hz | 16 Hz | 26 Hz | 25 Hz |
| Vacuum power, MC | 38 Hz | 18 Hz | 32 Hz | 35 Hz |
| Vacuum power, PC | 38 Hz | 18 Hz | 32 Hz | 35 Hz |

The multi layered sheets with a foamed core layer show an increase of thickness of the core layer of 50 to 60% which indicates sufficient foamability of the polypropylene composition of the core layer. The foaming properties are presented in Table 2.

TABLE 2

Foaming properties of the multi layered sheets 1-4

| | Sheet 1 | Sheet 2 | Sheet 3 | Sheet 4 |
|---|---|---|---|---|
| Real thickness [μm] | 690 | 830 | 730 | 420 |
| Width [mm] | 857 | 923 | 709 | 757 |
| Length [m] | 50 | 50 | 50 | 50 |
| Thickness Skin CR [μm] | 125 | 125 | 125 | 70 |
| Thickness Skin AR [μm] | 125 | 125 | 125 | 70 |
| Thickness Core before foaming [μm] | 290 | 388 | 313 | 175 |
| Thickness Core after foaming [μm] | 440 | 580 | 480 | 280 |
| Foaming ratio [%] | 52 | 50 | 54 | 60 |
| Total density reduction [%] | 22 | 23 | 23 | 25 |
| Application | tray | tray | container | lid |

Figure 2:
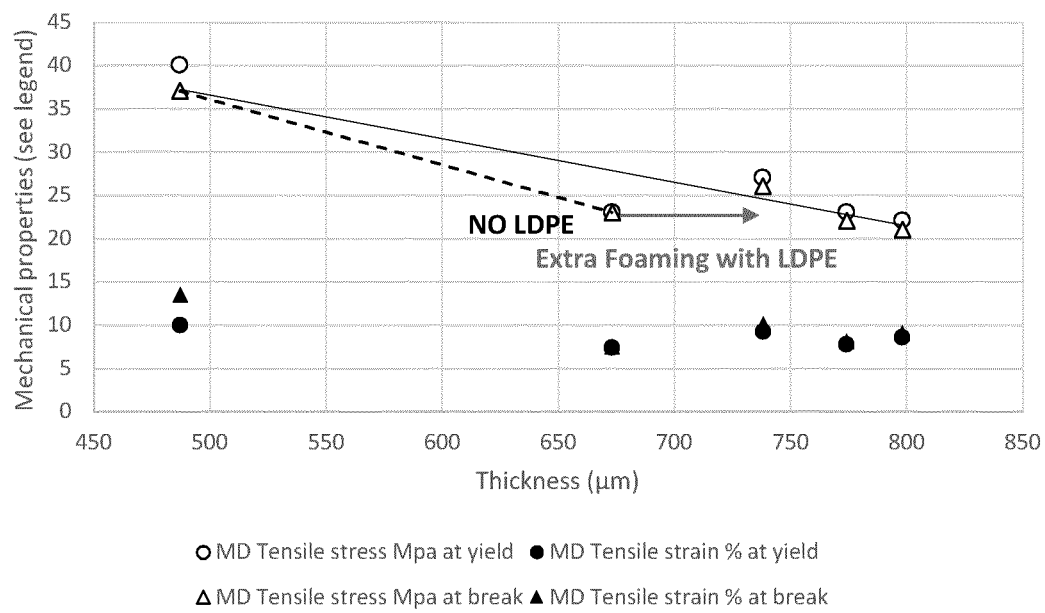
FIG. 2 shows the MD tensile stress at break, MD tensile strain at break, MD tensile stress at yield and MD tensile strain at yield of the foamed sheets 1-4 as a function of the thickness of the foamed sheet.
Figure 3:
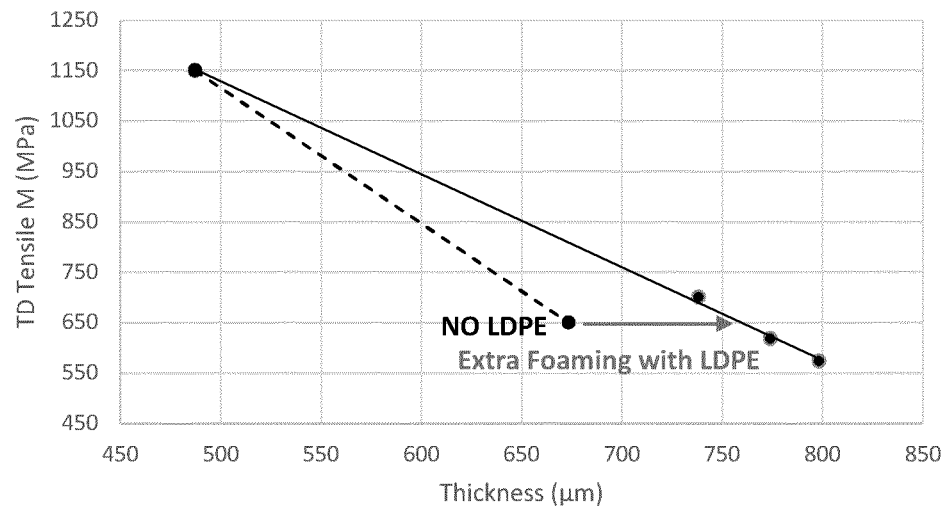
FIG. 3 shows the TD tensile modulus of the foamed sheets 1-4 as a function of the thickness of the foamed sheet.
Figure 4:
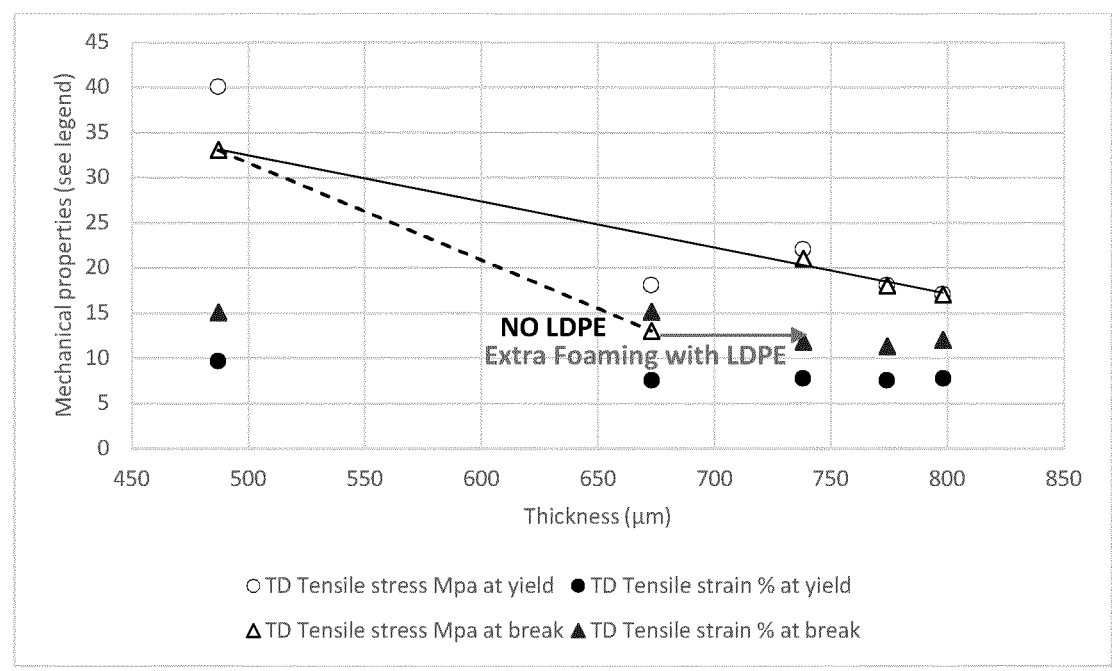
FIG. 4 shows the TD tensile stress at break, TD tensile strain at break, TD tensile stress at yield and TD tensile strain at yield of the foamed sheets 1-4 as a function of the thickness of the foamed sheet.

Additionally, the foamed sheets show good mechanical properties in machine direction (MD) and transverse direction (TD) as can be seen in FIGS. 1-4. Thereby, FIG. 1 shows the MD tensile modulus of the foamed sheets as a function of the thickness of the foamed sheet. FIG. 2 shows the MD tensile stress at break, MD tensile strain at break, MD tensile stress at yield and MD tensile strain at yield of the foamed sheets as a function of the thickness of the foamed sheet. FIG. 3 shows the TD tensile modulus of the foamed sheets as a function of the thickness of the foamed sheet. FIG. 4 shows the TD tensile stress at break, TD tensile strain at break, TD tensile stress at yield and TD tensile strain at yield of the foamed sheets as a function of the thickness of the foamed sheet. In each figure the mechanical properties are compared to the mechanical properties of foamed sheets with a core layer made from the comparative polypropylene compositions which do not include LDPE. At comparable mechanical properties a higher thickness of the foamed sheets can be obtained with the foamed core layers according to the invention.

c) Thermoforming of the Multi Layered Sheets 1-4

The multi layered sheets 1-4 were thermoformed into trays, containers and lids as shown above in Table 2 using commercial thermoforming lines.

The thermoformed parts show good surface and mechanical quality in visual inspection. The shrinkage of the parts was observed upon heat exposure in an oven and showed no unacceptable shrinkage. The lid fit perfectly well with the container showing good three dimensional stability.

d) Preparation of Multi-Layer Foamed Sheets Using Calendar Technology

Three layer sheets were prepared using the polypropylene compositions as described above under a) as core layer and HC250TF as skin layers in a L type calendar sheet line HOTPACK manufactured by Piovan. The die is in angular configuration to the calendaring roller configuration. The coextrusion line consists of one single screw extruder for the extrusion of the core layer and two 40 mm satellite extruders for the extrusion of the skin layers. The principle configuration of the L type calendar sheet line is shown in FIG. 5.

For foaming chemical foaming agent masterbatch Hydrocerol CT3232, commercially available from Clariant, is added to the polypropylene compositions of the core layer in an amount of 2.2 wt % of the total polypropylene composition during extrusion. No foaming agent was added to the HC250TF of the skin layers.

Several trials were made for calendaring multi-layer sheets using the above described compositions and calendar sheet line.

For all trials the following conditions were used:
Primary extrusion temperature profile: 215-240° C.
Secondary extrusion temperature profile: 215-240° C.
Temperature of all cylinders: 20° C.
Pressure at end of primary: 102 bar In the first trials the gap between the die and the first cylinder was about 20 cm and the quality of the foamed sheet was poor.

The following measures were taken:
1) Reduction of the gap between the die and the first cylinder from about 20 cm to about 8 cm
2) Reduction of the pressure between all cylinders
3) Separation of all cylinders so that the foamed sheet has contact with one cylinder at the time only These measured resulted in an improved visual appearance of the calendared foamed multilayer sheets.

Two multilayer sheets with different thickness were produced for thermoforming trays and cups.

For trays three-layer sheets with thicknesses of 40 μm each for the skin layers and 700 μm for the core layer (40-700-40) were produced (sheet 5).

For cups three-layer sheets with thicknesses of 40 μm each for the skin layers and 560 μm for the core layer (40-560-40) were produced (sheet 6).

The multi layered sheets with a foamed core layer show an increase of thickness of the core layer of about 16%. The foaming properties are presented in Table 3.

TABLE 3

| Foaming properties of the multilayer sheets 5 and 6 | | |
|---|---|---|
| | Sheet 5 | Sheet 6 |
| Real thickness [μm] | 700 | 560 |
| Thickness Skin CR [μm] | 40 | 40 |
| Thickness Skin AR [μm] | 40 | 40 |
| Thickness Core before foaming [μm] | 508 | 390 |
| Thickness Core after foaming [μm] | 620 | 480 |
| Foaming ratio [%] | 22 | 23 |
| Total density reduction [%] | 16 | 16 |
| Application | tray | cup |

The weight reduction of 16% was lower than expected. A higher weight reduction is expected when increasing the thickness of the skin layers from 40 μm to about 100 μm.

e) Thermoforming of the Multi Layered Sheets 5 and 6

The multi layered sheets 5 and 6 were thermoformed into trays and cups as shown above in Table 3 using commercial thermoforming lines.

The thermoformed parts show good surface and mechanical quality in visual inspection.

f) Conclusions

The polypropylene compositions according to the invention can be formed into multilayer sheets having a foamed core layer. The sheets can be produced in cast sheet lines and calendar sheet lines.

A minimum thickness of the skin layers need to be applied for obtaining a sufficient foamability and weight reduction.

For the calendaring process, process adjustments as discussed above resulted in improved performance.

It has surprisingly been found that foamed sheets with sufficient mechanical stability and weight reductions can be formed from polypropylene compositions which do not include HMS propylene polymer resins but only include linear propylene homopolymer with a minor amount of LDPE.

The invention claimed is:

1. A foamed polypropylene composition comprising:
   (A) from 60.0 to 95.0 wt % of a linear propylene homopolymer and
   (B) from 5.0 to 40.0 wt % of a low density polyethylene, based on the total weight of the polypropylene composition,
   wherein the polypropylene composition before foaming has a melt flow rate $MFR_2$ of from 0.1 to 5.0 g/10 min, determined according to ISO 1133 at a load of 2.16 kg and a temperature of 230° C., and a $F_{30}$ melt strength of from 0.1 to 2.0 cN, determined according to ISO 16790:2005.

2. The foamed polypropylene composition according to claim 1 having a v30 melt extensibility of less than 150 mm/s, determined according to ISO 16790:2005.

3. The foamed polypropylene composition according to claim 1, wherein the linear propylene homopolymer (A) has a $F_{30}$ melt strength of less than 5.0 cN, and/or a v30 melt extensibility of less than 150 mm/s, both determined according to ISO 16790:2005 and/or a melt flow rate $MFR_2$ of from 0.5 to 6.0 g/10 min, determined according to ISO 1133 at a load of 2.16 kg and a temperature of 230° C.

4. The foamed polypropylene composition according to claim 1, wherein the low density polyethylene (B) has a density of from 915 to 930 kg/m$^3$, determined according to ISO 1183D and/or a melt flow rate MFR$_2$ of from 0.1 to 2.0 g/10 min, determined according to ISO 1133 at a load of 2.16 kg and a temperature of 190° C.

5. The foamed polypropylene composition according to claim 1, wherein the polypropylene composition further comprises a nucleating agent (C).

6. The foamed polypropylene composition according to claim 1, wherein the polypropylene composition further comprises a foaming agent (D).

7. The foamed polypropylene composition according to claim 1, having a density after foaming of from 300 to 700 kg/m$^3$.

8. The foamed polypropylene composition according to claim 1, comprising from 65.0 to 92.5 wt % of the linear propylene homopolymer and from 7.5 to 35.0 wt % of the low density polyethylene, based on the total weight of the polypropylene composition.

9. The foamed polypropylene composition according to claim 1, comprising from 75.0 to 87.5 wt % of the linear propylene homopolymer and from 12.5 to 25.0 wt % of the low density polyethylene, based on the total weight of the polypropylene composition.

10. A sheet comprising the foamed polypropylene composition according to claim 1.

11. The sheet according to claim 10 being a multi-layered sheet.

12. The sheet according to claim 11 comprising a core layer (CL) sandwiched by two skin layers (SL) in adherent contact with the core layer (CL) in the configuration SL-CL-SL, wherein the core layer comprises the foam according to claim 1.

13. The sheet according to claim 12, wherein the skin layers comprise an unfoamed propylene polymer composition.

14. The sheet according to claim 10 having a total thickness of from 175 µm to 1400 µm.

15. The sheet according to claim 12, wherein the core layer has a thickness of from 75 µm to 1000 µm and the skin layers each independently have a thickness of from 50 µm to 200 µm.

16. A process for producing a sheet according to claim 10 comprising the steps of:
   a) preparing a polypropylene composition by blending from 60.0 to 95.0 wt % of a linear propylene homopolymer (A) and from 5.0 to 40.0 wt % of a low density polyethylene (B), based on the total weight of the polypropylene composition;
   b) subjecting the polypropylene composition to a foaming process;
   c) forming the foamed polypropylene composition into a foamed sheet.

17. An article comprising the foamed polypropylene composition according to claim 1.

18. The article according to claim 17 being a container, a bottle, cup, can, canister, bowl or tray.

19. An article comprising the sheet according to claim 10.

20. An article comprising a sheet as produced by claim 16.

* * * * *